United States Patent [19]

Sundholm

[11] 4,252,346
[45] Feb. 24, 1981

[54] CONNECTION FOR TRANSITION FROM A CUTTING RING JOINT OR SIMILAR TO A FLANGE JOINT

[76] Inventor: Göran V. Sundholm, Nahkelantie, 04300 Hyrylä, Finland

[21] Appl. No.: 966,725

[22] Filed: Dec. 5, 1978

[30] Foreign Application Priority Data

Dec. 19, 1977 [FI] Finland .............................. 773838

[51] Int. Cl.³ ............................................. F16L 41/00
[52] U.S. Cl. ..................................... 285/18; 285/158; 285/179; 285/334.1; 285/382.7; 285/414
[58] Field of Search ................... 285/334.1, 334.2, 414, 285/189, 382.7, 363, 158, 415, 334.3, 18

[56] References Cited

U.S. PATENT DOCUMENTS

| 262,581 | 8/1882 | Doolittle | 285/414 |
|---|---|---|---|
| 718,157 | 1/1903 | Riber | 285/334.1 X |
| 2,211,983 | 8/1940 | Parris | 285/414 X |
| 2,255,673 | 9/1941 | McDermott | 285/382.7 |
| 2,712,458 | 7/1955 | Lipson | 285/334.1 X |
| 2,788,993 | 4/1957 | Oldham | 285/334.2 X |
| 2,967,069 | 1/1961 | Holmes | 285/414 X |
| 3,206,232 | 9/1965 | Gleason et al. | 285/161 |
| 3,336,055 | 8/1967 | Pall et al. | 285/158 X |
| 3,532,365 | 10/1970 | Kronschnabel | 285/334.5 X |
| 3,545,793 | 12/1970 | Graffy | 285/158 |

FOREIGN PATENT DOCUMENTS

2418243  10/1975  Fed. Rep. of Germany ........ 285/334.1

*Primary Examiner*—Thomas F. Callaghan
*Attorney, Agent, or Firm*—Ladas & Parry

[57] ABSTRACT

A connection for transition from a cutting ring joint to a flange joint. In a conventional connection piece for cutting ring joints is applied an insertion piece for abutment against a fixed flange. On the end thread of the connection piece is screwed a flange which is secured to the fixed flange.

9 Claims, 3 Drawing Figures

U.S. Patent
Feb. 24, 1981
4,252,346
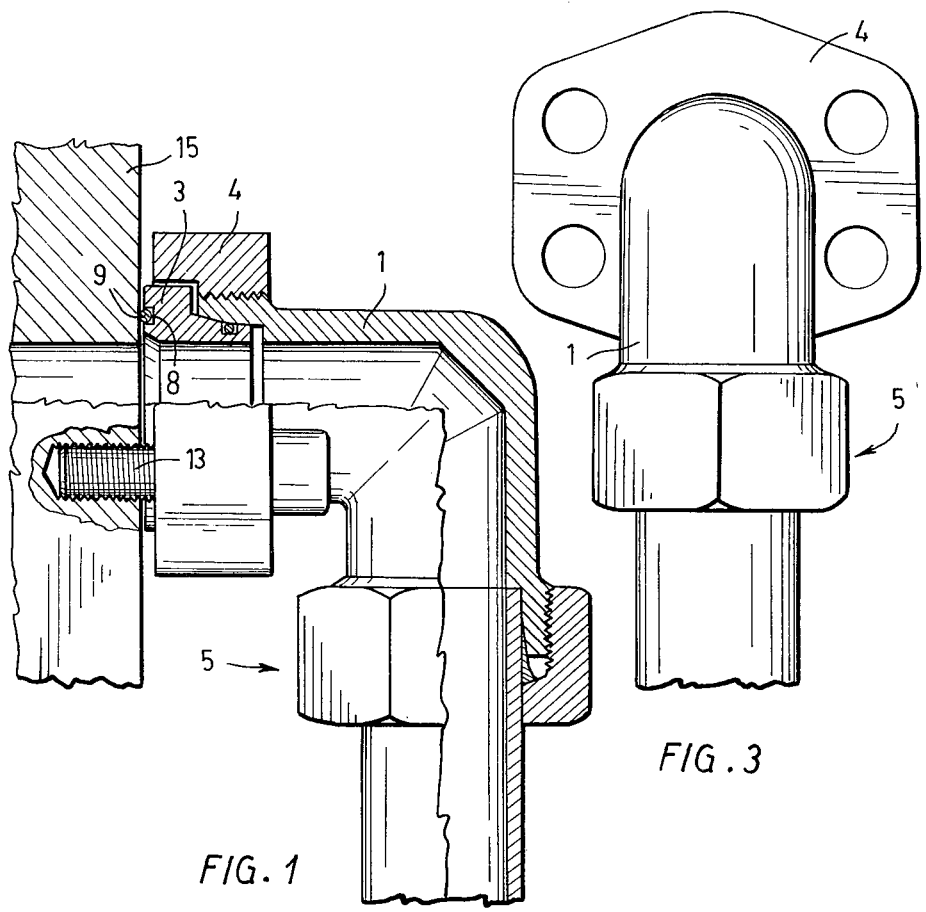
FIG. 1
FIG. 3
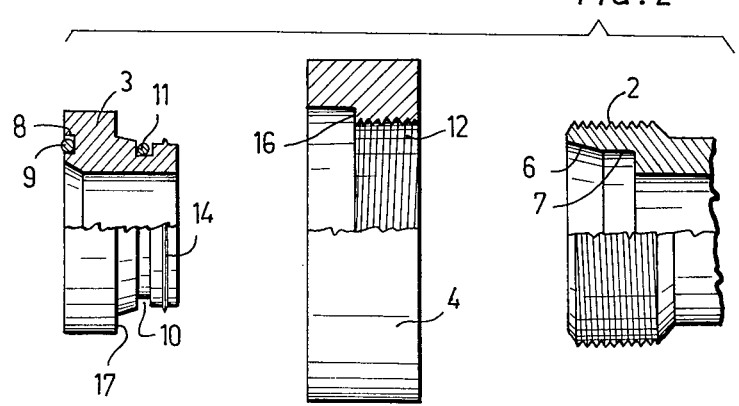
FIG. 2

CONNECTION FOR TRANSITION FROM A CUTTING RING JOINT OR SIMILAR TO A FLANGE JOINT

The present invention relates to a connection for transition from a cutting ring joint or similar to a flange joint.

In the field of hydraulics, so-called cutting ring joints or compression joints wherein one of the pipe ends receives the other end and is provided with an outer thread on which a clamping nut provided with a shoulder is screwed which presses a cutting ring or a compression ring against the inserted pipe end and thereby holds the joint together, and, on the other hand, flange joints are commonly used. Lately, cutting ring and compression joints have been increasingly used, especially in connection with smaller pipe diameters, because they are less expensive than flange joints.

Fairly often, however, for example, in pumps and various types of working cylinders, one of the halves of the joint is a fixed flange, whereby it is necessary to provide a transition from a cutting ring joint to a flange joint. Often, the connection piece to be joined to the fixed flange is a T-piece or an L-piece, for example, in working cylinders in excavators. So far, this problem has been mainly solved by manufacturing connection pieces specially designed for the purpose, one end whereof is shaped for a cutting ring joint and the other end whereof is provided with a shoulder on which a clamping flange can abut. Compared to pure cutting ring connection pieces, such special connection pieces are, however, used to a fairly small extent, for which reason they involve disproportionately high extra costs of which, in addition to the actual manufacturing costs, also the storage costs represent a sizable proportion. The clamping flanges are comprised of two halves wherefrom follows that two flanges of this type cannot be interconnected.

In straight joints it is further known to on such cutting ring connection pieces where the end thread inwards terminates in a shoulder screw a flange provided with an inner thread whereafter this flange is connected to the fixed flange. In this case, both end surfaces of the flange screwed on must, however, be finished for providing the necessary seal, on one hand, against the shoulder of the cutting ring connection piece and, on the other hand, against the fixed flange. This solution cannot at all be applied to a connection involving an L- or T-piece because the flange must be firmly tightened against the shoulder of the cutting ring connection piece and it is impossible to predict the final position of the flange screwed on and, accordingly, neither the direction of the other end or ends of the connection piece.

It is the object of the present invention to solve the above mentioned problems.

The connection according to the invention is characterized in that it comprises a coupling element intended for cutting ring couplings or similar and provided with an outer threading in at least one end thereof, an insert piece for insertion in the coupling element, and a flange provided with an inner threading corresponding to the threading of the coupling element and fastened in a way known per se, e.g., by means of bolts. According to the invention, instead of a specially made connection piece, a conventional mass-produced cutting ring connection piece is used in combination with a simple and inexpensive insert piece and a conventional flange which is screwed on the end thread of the cutting ring coupling element. If the end surface of the flange to which the connection is made is planar, the end surface of the insert piece abutting thereon is provided with an annular groove in which a seal ring is inserted. If the connection is made to a pipe end, this end is itself usually provided with a seal, whereby the outer end of the insert piece is made planar. The flange is screwed on the thread of the connection piece to such an extent that it does not in a tightened position touch the flange to which the connection is made, wherefore its end surface need not be finished. When making a connection to a flanged pipe end, said end, however, often projects from the flange, whereby the flange screwed on the connection piece can be arranged to extend past the outer end of the insert piece to guide the pipe end. The flange screwed can always be brought into the desired turning position, due to which also the other end of the connection piece is brought into the desired position.

The receiving ends of presently used cutting ring connection pieces are in most cases provided with an outer conical part and an inner cylindrical part, whereby the insert piece is given a corresponding shape.

As the conical surfaces abutting each other are finished surfaces they may for some purposes provide a sufficient seal themselves but generally it is preferable to provide either the conical or the cylindrical surface of the insert piece with a groove for e.g., an O-ring. Since the cylindrical surface in most cases is of poorer quality than the conical surface, the best result is achieved by providing the seal at the latter. This arrangement, however, causes a problem in that it is difficult to place the insert piece in its final position because the elastic O-ring tends to push the insert piece outwards. When the connection is tightened the insert piece will move inwards to an extent difficult to estimate which in turn makes it difficult to determine how much the flange is to be screwed on the end thread of the cutting ring connection piece, especially in the case where the insert piece is intended to reach outside of the flange end surface in the tightened state.

This problem is solved by a preferable embodiment of the invention, wherein the cylindrical surface of the insert piece is provided with a small protrusion which is deformated upon insertion and then keeps the insert piece in place. For the release of the insert piece the flange is preferably provided with an inner shoulder which upon unscrewing the flange engages a cylindrical outer part of the insert piece and pushes it out.

The invention will now be described in detail with reference to a preferred embodiment shown in the accompanying drawing.

FIG. 1 is a partial section of the connection when assembled.

FIG. 2 is an exploded view of the main parts of the connection, and

FIG. 3 is an end view of the connection piece and the flange.

The drawing illustrates a connection according to the invention for connecting a hydraulic pipe line system utilizing cutting ring joints, e.g., to a fixed flange schematically indicated by numeral 15. The connection is shown as an L-connection frequently used in connection with, for example, pumps or working cylinders in excavators.

The connection comprises a conventional connection piece 1 intended for a cutting ring joint, with outer threads 2 at its ends and receiving openings each with a conically tapering part 6 continuing in a cylindrical part 7 (FIG. 2), and to be connected in its left end in FIG. 1 to the fixed flange 15. The other end of the connection piece 1 is joined to a pipe by means of an ordinary cutting ring joint 5.

A correspondingly shaped insert piece 3 is inserted in the receiving opening. When the joint is tightened the insert piece 3 extends past the end of the connection piece 1 and abuts the end surface of the fixed flange 15. To provide a seal against said flange, the outer end of the insert piece is provided with an annular groove 8 in which a seal ring 9 is inserted. To provide a seal between the insert piece 3 and the connection piece 1, the insert piece is provided with a groove 10 in which a seal ring 11 is placed. In the embodiment shown in the drawing, the seal ring 11 is located at the conical part of the insert piece, just at the junction to the cylindrical part.

On the end thread 2 of the connection piece 1 is screwed a flange 4 having a corresponding inner thread 12 and clamped by means of bolts 13 in threaded receiving openings of the fixed flange 15. The flange 4 is screwed so far up on the threads that it does not touch the fixed flange in the assembled state.

To keep the insert piece in place against the outwardly directed force of the resilient ring 11 before tightening bolts 13 the cylindrical inner part of the inner piece 3 is provided with a small annular protrusion 14 which is deformed upon inserting and thus does not show in FIG. 1. Protrusion 14 need not be continuous. To facilitate the release of the insert piece the flange 4 is provided with an inner shoulder 16 engaging a shoulder 17 of the insert piece when flange 4 is being unscrewed.

What I claim is:

1. A connection assembly for connecting an end of a tubular member to a flat apertured member, comprising a connection piece which has at least two ends and defines an internal passage which extends from one end of the connection piece to the other end thereof and is enlarged at said one end for receiving said end of the tubular member surrounded by a sealing ring and is also enlarged at said other end of the connection piece, said connection piece being provided at said one end with an external screwthread whereby an internally threaded sleeve may be screwed onto said one end for urging the sealing ring into the enlargement of the passageway at said one end of the connection piece thereby to establish a seal between the connection piece and said end of said tubular member, and said connection piece also being provided with an external screwthread at said other end thereof; and the assembly further comprising an insert member adapted to be fitted in sealing manner in the enlargement of the internal passage of the connection piece at said other end thereof, and an internally threaded flange member adapted to be screwed onto the external screwthread at said other end of the connection piece and to be secured to said flat apertured member, said insert member having a peripheral flange portion of greater external diameter than the connection piece at said other end thereof and the flange member having an internal shoulder which engages said flange portion when the flange member is unscrewed from the connection piece to pull the insert member out of the enlargement at said other end of the connection piece, and the flat apertured member having an outer face and the insert member having an outer end face for engaging said outer face of the flat apertured member, one of said faces being formed with an annular recess and there being a sealing member disposed in said annular recess.

2. A connection assembly as claimed in claim 1, wherein the enlargement of said passage at said other end of the connection piece has an inner cylindrical part, which terminates in a shoulder joining the enlargement to the rest of the passage, and an outer frusto-conical part, and the insert member has a peripheral surface which is shaped substantially complementarily with said enlargement, and wherein the insert member is formed with a peripheral groove and a sealing member is disposed in said groove.

3. A connection assembly for connecting an end of a tubular member to a flat apertured member, comprising a connection piece which has at least two ends and defines an internal passage which extends from one end of the connection piece to the other end thereof and is enlarged at said one end of the connection piece for receiving said end of the tubular member surrounded by a sealing ring and is also enlarged at said other end of the connection piece, said connection piece being provided at said one end with an external screwthread whereby an internally threaded sleeve may be screwed onto said one end for urging the sealing ring into the enlargement in the passageway at said one end of the connection piece thereby to establish a seal between the connection piece and said end of said tubular member, and said connection piece also being provided with an external screwthread at said other end thereof; and the assembly further comprising an insert member adapted to be fitted in the enlargement of the internal passage of the connection piece at said other end thereof, and an internally threaded flange member adapted to be screwed onto the external screwthread at said other end of the connection piece and to be secured to said flat apertured member, said insert member having a peripheral flange portion of greater external diameter than the connection piece at said other end thereof and the flange member having an internal shoulder which engages said flange portion when the flange member is unscrewed from the connection piece to pull the insert member out of the enlargement at said other end of the connection piece, and the insert member having an outer end face for engaging the flat apertued member and being formed in said outer end face with an annular recess, there being a first sealing member disposed in said annular recess and a second sealing member disposed between the connection piece and the insert member.

4. A connection assembly as claimed in claim 3, wherein the insert member is formed with a peripheral groove and said second sealing member is disposed in said groove.

5. A connection assembly as claimed in claim 1 or 3, wherein the connection piece has two branches which are disposed at right angles to each other and which terminate in said two ends respectively of the connection piece.

6. A connection assembly as claimed in claim 1 or 3, wherein the enlargement of said passage at said other end of the connection piece has an inner cylindrical part, which terminates in a shoulder joining the enlargement to the rest of the passage, and an outer frusto-conical part, and the insert member has a peripheral surface which is shaped substantially complementarily with said enlargement.

7. A connection assembly as claimed in claim 3, wherein the enlargement of said passage at said other end of the connection piece has an inner cylindrical part, which terminates in a shoulder joining the enlargement to the rest of the passage, and an outer frusto-conical part, and the insert member has a peripheral surface which is shaped substantially complementarily with said enlargement, and wherein the insert member is formed with a peripheral groove and said second sealing member is disposed in said groove.

8. A connection assembly as claimed in claim 7 or 2, wherein said peripheral groove is formed in that part of the insert member which is shaped to be substantially complementarily with said inner cylindrical part of the enlargement at said other end of the passage.

9. A connection assembly as claimed in claim 1 or 3, wherein the insert member is provided with a deformable peripheral rib which engages the interior surface of the enlargement at said other end of the passage when the insert member is received in said enlargement.

* * * * *